Aug. 18, 1942.    F. E. McLAUGHLIN    2,293,068
VALVE MECHANISM
Filed July 24, 1940

INVENTOR
Frederick E. McLaughlin
BY
ATTORNEY

Patented Aug. 18, 1942

2,293,068

UNITED STATES PATENT OFFICE 2,293,068

VALVE MECHANISM

Frederick E. McLaughlin, Centralia, Wash., assignor to George Automatic Train Control Company, Seattle, Wash., a corporation of Washington Application July 24, 1940, Serial No. 347,268

2 Claims. (Cl. 303—1)

This invention relates to valve mechanism of a construction which is particularly adapted for use in connection with train control mechanism, such as that illustrated in United States Letters Patent to C. B. George 2,170,137 and George C. George No. 1,858,493 and 2,177,648.

In such Letters Patent train control mechanism in the nature of an automatic retainer valve is provided controlling the exhaust from a standard triple valve. My invention relates particularly to the valve device used for opening or closing the exhaust from the triple valve to the atmosphere.

A particular problem obtains in the operation of valve mechanisms employed in such train brake control mechanisms in that a movable valve member is urged to open position by air pressure and against an adjustable spring pressure tending to close the valve mechanism. When the air pressure exerts a force above the force exerted by the spring, the valve moves into open position and when the air pressure exerts a force less than that of the spring, the spring closes the valve. Thus during operative periods, the valve mechanism is opened or closed by slight changes of pressure and at the same time a seal for substantial pressures must be provided. Furthermore, when the air pressure is completely released, the full force of the spring is urged against the valve member requiring a valve member adapted for such circumstances. Normally where valves are operated by slight changes of pressure, resilient washers, such as rubber, are employed. However, where very substantial pressures are utilized to operate the valve mechanism, a metallic seat must be provided to withstand the pressure. Thus in the operation of the valve mechanism for train brake control mechanism, it is necessary to have a valve particularly adapted for operation by very small pressures and also one which may be operated by very large pressures.

In the prior art, valve mechanisms were employed as typified in said before mentioned Letters Patent and employed rubber gaskets to provide for the air seal. However, when the air pressure was completely released and the full spring pressure was urged against such a rubber gasket, deformation of the rubber gasket, cutting of the rubber gasket, and sticking of the valve were of common occurrence.

It is an object of this invention to provide a valve mechanism which may be urged into and out of seating arrangement by small changes of pressure and at the same time of a construction which will withstand extremely high valve operating pressures without damage to the valve seat. It is a further object of the invention to provide a valve mechanism which will eliminate sticking of the valve and permit a valve to operate with the degree of nicety necessary in such environment as train brake control mechanism.

The above mentioned general objects of my invention, together with others inherent in the same, are attained by the device illustrated in the following drawing, the same being a preferred exemplary form of embodiment of my invention, throughout which drawing like reference numerals indicate like parts:

Figure 1:
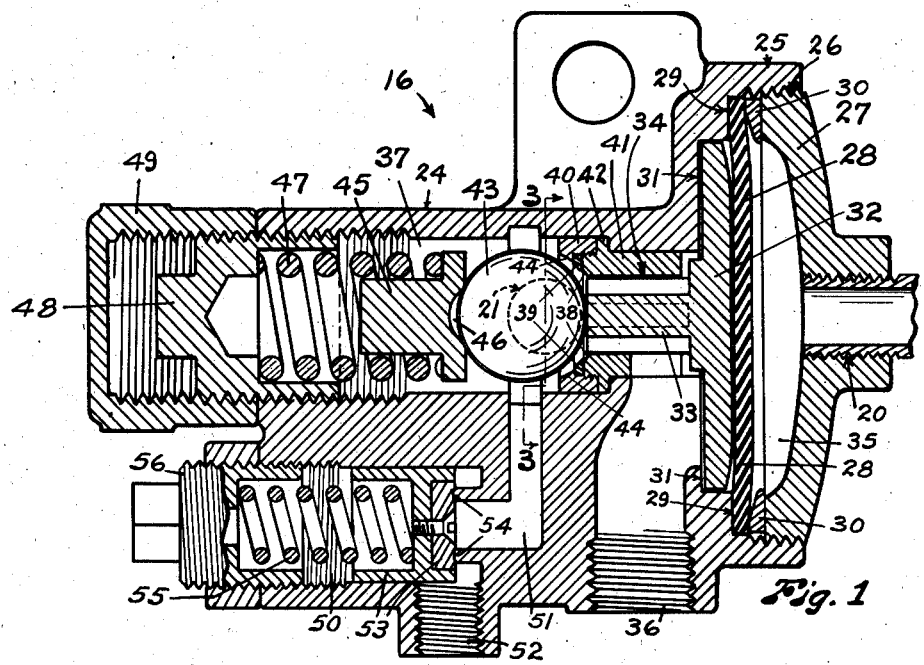
Figure 1 is a view partly in section and partly in elevation with parts broken away, of a train control mechanism employing the valve mechanism of my invention.
Figure 4:
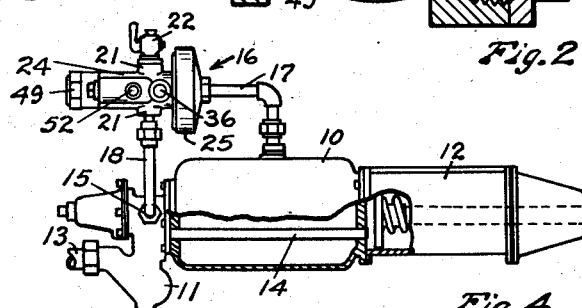
Figure 5:
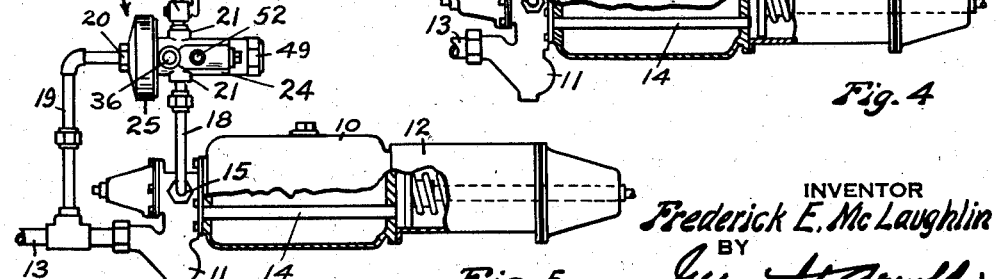

Fig. 4 is a view in elevation on a smaller scale than the preceding figures showing the train control mechanism of Figure 1 installed in connection with a triple valve, an auxiliary reservoir and a brake cylinder all of standard construction, wherein the pressure in the auxiliary reservoir controls the operation of the train control mechanism; and Fig. 5 is a view similar to Fig. 4, except the train control mechanism is controlled by the pressure in the air pressure supply pipe or train line rather than from the auxiliary reservoir as shown in Fig. 4.

Referring more particularly to Fig. 4, the train brake control mechanism discloses the system employed by George C. George in the United States Letters Patent No. 1,858,493 and 2,177,648 wherein the operation of the train brake control mechanism is controlled by the pressure within the auxiliary reservoir. In such Fig. 4, the auxiliary reservoir 10, triple valve 11, and brake cylinder 12 are all of standard construction. The air pressure supply pipe 13 commonly called "train line" or "brake pipe," is connected by means of the triple valve 11 with the said auxiliary reservoir 10 and brake cylinder 12. The brake cylinder 12 is also connected by way of conduit 14 with the triple valve exhaust 15. The operation and construction of a triple valve, as 11, is standard in the art, is shown in said Letters Patent 2,170,137, forms no part of this invention, and is therefore not shown or described. In the event that the train control mechanism is utilized in the system shown in Fig. 4, the train control mechanism indicated generally by 16 is connected by conduit 17 with the auxiliary reservoir 10 and by conduit 18 with the triple valve exhaust 15.

Referring more particularly to Fig. 5, similar parts in this figure are numbered similarly to those in Fig. 4, the difference residing in that the conduit 17 of Fig. 4 connecting with the auxiliary reservoir 10 is eliminated and in place thereof, there is employed a conduit 19 connecting the train control mechanism 16 with the air pressure supply 13. This construction therefore employs the system shown in United States Letters Patent to C. B. George 2,170,137.

Figure 3:
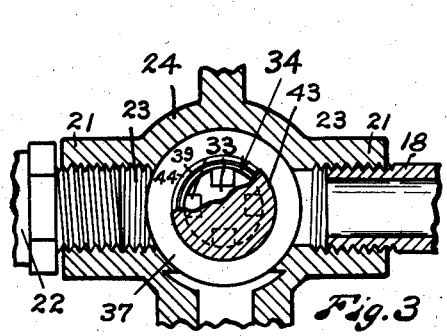
Fig. 3 is a sectional view taken substantially on broken line 3—3 of Fig. 1, parts being broken away.
Figure 2:
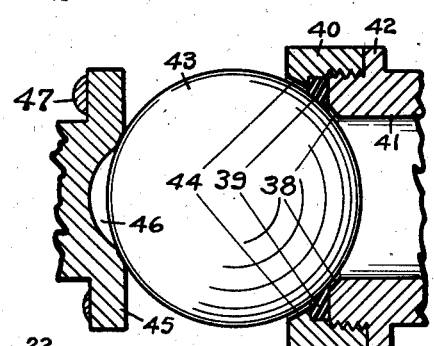
Fig. 2 is an enlarged fragmentary view of my valve mechanism shown in Fig. 1.

Referring more particularly to the manner in which the valve mechanism shown in Figs. 1, 2 and 3 is connected with the standard auxiliary reservoir 10, triple valve 11, brake cylinder 12, train pipe 13 and triple valve exhaust 15, I have shown in Fig. 1 a port 20 which is connected to the conduit 17 of Fig. 4 or the conduit 19 of Fig. 5. Also the conduit 18 connects the triple valve exhaust 15 with one port 21. The other port 21 is provided with a manually operable valve 22. The valve 22 when open serves to connect the system up as a standard brake control system and eliminates the functioning of the train control mechanism 16. When the valve 22 is open, the exhaust from the triple valve 15 passes via conduit 18 through passageways 23 and out through open valve 22 to the atmosphere. On the other hand, when the valve 22 is closed the train control mechanism will operate in a manner hereinafter set forth.

The train control valve shown in Figs. 1 to 3 comprises a housing 24 formed at one end with an enlarged portion 25 having an internally threaded annular wall 26 to receive a threaded cap 27 which is provided with a port 20 to receive a pressure inlet pipe, as the pressure inlet pipe 17 connected to the auxiliary reservoir as shown in Fig. 4 or the pressure inlet pipe 19 connected to the air pressure supply 13 of Fig. 5. An enlarged chamber 35 is provided between the housing 24 and the threaded cap 27. A flexible diaphragm 28, preferably made of rubber, is disposed within the chamber 35 and held against shoulder 29 by means of a retaining ring 30. The bottom wall 31 of the enlarged chamber 35 forms a seat for a valve operating disk 32 which is provided with a fluted stem 33 which is slidably mounted within a bore 34 of the body of the housing 24.

The bore 34 is in open communication with the exhaust duct 36 for the escapement of air to be more fully hereafter described. The housing 24 is also provided with another bore 37 in axial alignment with the bore 34 and my valve mechanism is provided therebetween. The valve and the valve seat comprise the subject matter of this invention and embody the valve seat on the tubular member 41 (see particularly Fig. 2), an annular flexible ring 39, as made of rubber, and an annular retainer ring 40 threadedly connected with the tubular member 41. The tubular member 41 is provided with a boss or shoulder 42 to provide a stop for tubular member 41 and a stop against which the annular retainer ring 40 may be tightened as respects the tubular member 41. Preferably the tubular member 41 is ground to a size so that it may be pressed snugly within and held by the bore 34. The annular retaining ring 40 is ground to provide a valve seat 44. The valve seat 44 and the valve seat 38 are ground to provide a seating face concentric with a ball member 43. The annular flexible ring 39 is formed to provide a surface extending slightly above the concave ball globe seating path of the valve seats 38 and 44. The annular flexible ring 39 may be compressed by the ball 43 toward the retaining ring 40 by relatively high pressure from the said ball 43. Air pressure in the enlarged chamber 35 tends to move the diaphragm 28, valve operating disk 32, stem 33, and ball member 43 into the position shown in Figure 1 of the drawing, thus opening a valve mechanism embodying the ball 43 and a valve seat comprising flexible ring 39 alone or valve seats 38 and 44 and said flexible ring 39 as hereinafter explained.

Within the bore 37 is slidably mounted a piston like member 45 provided at one end with a concave recess 46 adapted to engage ball 43. The piston 45 is shaped to receive one end of a compression spring 47, whose opposite end bears against an adjustably mounted plug 48 threadedly mounted within the bore 37, as shown. The outer end of adjustably mounted plug 48 is provided with a closure cap 49 which also serves as a locking nut to retain the plug 48 in any of its adjusted positions. The compression spring 47 yieldingly urges the ball member 43 toward its valve seat, comprising valve seats 38 and 44 and flexible ring 39, and toward the stem 33. The compression of spring 47 is adjustable by means of plug 48 to yield to a predetermined pressure of air against the flexible diaphragm 28, valve operating disk 32, stem 33, ball 43, and piston like member 45. In other words, if it is desired that the valve mechanism 43, 44, 39 and 38 is to be maintained open with a predetermined air pressure entering port 20, the compression of the spring 47 is adjusted by means of plug 48 so that the valve mechanism will be at a balance when the air pressure, in chamber 35, is slightly below the said predetermined air pressure. The differential in pressure between the pressure of spring 47 exerted against ball 43 and the pressure exerted against said ball from the air in chamber 35 to cause opening or closing movement of my valve mechanism may be in the nature of fractions of a pound.

It is of importance in this invention to note that a balanced condition will exist during operating periods between the spring pressure of the spring 17 against the ball 43 and the air pressure which is transmitted to said ball by way of flexible diaphragm 28, valve operating disk 32, and stem 33. The raising or lowering of the air pressure above or below the air pressure required to maintain a balance will cause the ball 43 to move away from or toward its seat. If the pressure exerted by the compression spring 47 is only slightly above the opposing pressure exerted by the air pressure, then the ball 43 will move in seating relation to the annular flexible ring 39, a position shown in Fig. 2 of the drawing. Thus, even with a slight differential of pressure I am able to maintain a seal between the ball 43 and the annular flexible ring 39. On the other hand, if the air pressure is completely removed from the port 20, the spring 47 will urge the ball 43 until it will seat the same against the metallic seats 44 and 38 and compress the annular flexible ring 39 into the space between retaining ring 40 and tubular member 41 without damage to said ring 39. In the event that the valve mechanism of this invention is used in connection with a system as shown in Fig. 5, where the air pressure supply is exerted against the diaphragm 28, there will be many periods of operation where the air pressure against such diaphragm 28 is reduced to such an extent that considerable pressure will be exerted by the spring 47 urging the ball 43 against its valve seat, thus requiring a valve mechanism capable of withstanding extremely high operating pressures. Also if the valve mechanism of this invention is used in connection with either of the systems shown in Fig. 4 or 5, there will be many inoperative periods, such as when the cars of a train are not connected with an engine and during all such periods of time the full spring pressure of spring 47 will urge the ball 43 against its seat. When it is remembered that the pressure of spring 47 is constructions commonly in use amounts to some six hundred pounds pressure, it will be realized that a substantial pressure is involved by reason of such spring between the ball 43 and its seat. In prior art structures it was found necessary to use valve devices embodying flexible seating members to provide for the degree of nicety of operation where small operating pressures were present and which involved differentials of pressure between the spring 47 and the air pressure in chamber 35. At the same time such devices were unsatisfactory in that when the substantially full pressure of the spring was exerted against the valve and compressed the flexible seating members against their seat that sticking valves, ruined valves, and inoperative valves were not at all uncommon. I have provided a valve mechanism which meets the rigid requirements of the train brake control mechanisms wherein the valve mechanism operates with the desired nicety and at the same time is a valve which will withstand tremendous pressures.

The air pressure controlled by my valve mechanism may be of a relative high pressure—in train control systems seventy pounds per square inch—while the operating pressure for the valve mechanism may be a relatively low pressure— the differential between the pressure of spring 47 and the air on diaphragm 28—or a relatively high pressure as the pressure of spring 47 alone.

In the foregoing illustration and description of my invention, I have shown a valve member 43 and a seat therefor 44, 39 and 39. My invention is not to be confined to a ball and a concave seat therefore as the same are mere illustrations of a valve member and a seat provided with a resilient seating means and rigid seating means, where the resilient seating means first form a seal and upon further movement of the valve one or more further seals are provided.

The remainder of the valve mechanism shown in Figure 1 of the drawing embodies the "automatic blow-down feature" of the patent to George C. George 2,177,648 which is preferably used. This "automatic blow-down valve" comprises or includes a supplemental bore 50 in the housing 24. This bore connects with an exhaust duct 51 terminating in an outlet 52. The duct 51 also connects with the bore 37. Within the bore 50 is slidably mounted a valve member 53 adapted to seat against a valve seat 54. The valve member 53 is cup shaped to receive one end of a compression spring 55 whose opposite end bears against an adjustable retaining plug 56 threadedly mounted within the bore 50. The compression of spring 55 may be adjusted by means of plug 56 to exert a predetermined pressure against the valve member 53 to hold it closed against a predetermined air pressure within the duct 51, as for example 25 pounds pressure.

By means of the "automatic blow-down valve" just described, and particularly described in said Letters Patent No. 2,177,648, it is possible to charge the auxiliary reservoir 10 and any air pressure which leaves the brake cylinder 12 via the conduit 14, triple valve 11, conduit 18, port 21, bore 37, and exhaust duct 51, will be regulated by operation of the "automatic blow-down valve" so that a desired pressure, as 25 pounds, may be retained in the brake cylinder 12. As said "automatic blow-down valve" constitutes no part of this invention and is fully described in said Letters Patent No. 2,177,648, only the above summary description is given.

For purposes of illustration and clearness and definiteness of description, my valve mechanism invention has been set forth in connection with two types of train control mechanisms, but it is to be distinctly understood that the invention is not limited to such specific applications, but is co-extensive with all valve mechanisms wherein similar problems exist in whole or in part.

Obviously, changes may be made in the forms, dimensions and arrangement of the parts of my invention, without departing from the principle thereof, the above setting forth only a preferred form of embodiment.

I claim:

1. In a device of the class described, a movably mounted tapered metallic valve member; a concave valve seat operatively disposed as respects said valve member, said seat comprising two spaced apart rigid annular seat members forming therebetween an annular receptacle and an annular resilient member disposed within said receptacle and normally projecting a slight distance beyond the seating surface of the rigid members to provide resilient seal means for engagement by the valve member and compressible, to the seating level of said rigid seat members, into said annular receptacle without damage thereto by heavy pressure of said valve member; and opposed pressure exerting devices controlling, by differential pressure therebetween, movement of the valve toward and away from said valve seat, the effective pressure of the valve toward its seats being subject to variations over a substantial range, whereby said valve member upon relatively slight differential of pressure will seat on said resilient seating member and upon relatively great differential of pressure will seat on said rigid seating member.

2. In a device of the class described, a movably mounted metallic ball valve; a concave valve seat operatively disposed as respects said valve member, said seat comprising two spaced apart metallic annular seat members seating with said ball valve and forming between said two members an annular receptacle, and an annular resilient member disposed within said receptacle and normally projecting a slight distance beyond the seating surface of the metallic seat members to provide resilient seating means for engagement by the ball valve member and compressible, to the seating level of said metallic seat members, into said annular receptacle without damage thereto by heavy pressure on said ball valve member; and pressure exerting devices operatively connected with said ball valve moving said ball valve toward and away from said concave valve seat, whereby said ball valve member upon relatively slight pressure will seat on said resilient seating member and upon relatively great pressure will seat upon said metallic seat members.

FREDERICK E. McLAUGHLIN.